(12) United States Patent
Liao et al.

(10) Patent No.: US 11,372,728 B2
(45) Date of Patent: Jun. 28, 2022

(54) RETENTION TIME BASED CONSISTENT HASH RING

(71) Applicant: EMC IP Holding Company LLC, Hopkinton, MA (US)

(72) Inventors: Mengze Liao, Shanghai (CN); Lihui Su, Shanghai (CN); Arun Murti, Mission Viejo, CA (US); Roger Hongyi Che, Shanghai (CN); Zhenzhen Lin, Shanghai (CN); Xiaolei Hu, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 166 days.

(21) Appl. No.: 16/986,564

(22) Filed: Aug. 6, 2020

(65) Prior Publication Data

US 2022/0043715 A1    Feb. 10, 2022

(51) Int. Cl.
*G06F 12/00* (2006.01)
*G06F 11/14* (2006.01)
*G06F 16/188* (2019.01)
*G06F 16/16* (2019.01)
*G06F 9/455* (2018.01)
*G06F 16/13* (2019.01)

(52) U.S. Cl.
CPC ...... *G06F 11/1464* (2013.01); *G06F 9/45558* (2013.01); *G06F 11/1451* (2013.01); *G06F 11/1453* (2013.01); *G06F 11/1469* (2013.01); *G06F 16/137* (2019.01); *G06F 16/162* (2019.01); *G06F 16/188* (2019.01); *G06F 2009/45595* (2013.01)

(58) Field of Classification Search
None
See application file for complete search history.

(56) References Cited

U.S. PATENT DOCUMENTS

| | | | |
|---|---|---|---|
| 10,733,144 B2 * | 8/2020 | Basrani | G06F 16/152 |
| 10,783,120 B1 * | 9/2020 | Brown | G06F 3/065 |
| 2018/0217998 A1 * | 8/2018 | Blass | G06F 16/125 |

* cited by examiner

*Primary Examiner* — Daniel D Tsui
(74) *Attorney, Agent, or Firm* — Staniford Tomita LLP

(57) ABSTRACT

A retention-based consistent hash ring process defines each file name in the system to include its expiration date (or time) as a prefix or suffix that is stored and indexed as metadata. The process uses a virtual node to represent adjacent expiration days to create virtual nodes based on individual days of the week. Each physical node contains the same number of labeled virtual nodes, and the consistent hash ring process is used to move files with the same expiration day to different physical nodes by looking for next labeled virtual nodes on the hash ring. This provides a way to locate the virtual node storage location by specifying a file's expiration date as part of the key used in the hash ring process, and distributes files that may otherwise be assigned to the same physical node through a backup policy.

20 Claims, 7 Drawing Sheets

RETENTION TIME BASED CONSISTENT HASH RING

TECHNICAL FIELD

This invention relates generally to distributed file system networks, and to balancing file storage among nodes using a retention time based consistent hash ring.

BACKGROUND OF THE INVENTION

A distributed file system allows one or more central servers to store files that can be accessed by any number of remote clients (collectively the nodes) in a network. It uses a uniform naming convention and mapping scheme to keep track of file locations, and an authorization system to ensure proper access to the files. In a distributed file system, files are expected to be stored in as many different nodes as possible to balance storage capacities among nodes. Consistent hashing has been developed as a technique for distributing the load among multiple servers in a distributed file system network by napping each object to a point on a circle, and mapping each available server to many pseudo-randomly distributed points on the same circle.

In consistent hashing, each server is assigned multiple hash values based on its name or ID, and each request is assigned to the server with the "nearest" hash value. When a server is added or removed, most requests will map to the same server that they did before, allowing the system to add and remove servers without completely disturbing the set of cached items that each server holds.

Even in consistent hashing systems, certain circumstances can cause the storage system to become unbalanced. For example, users in a backup system often specify that files are to be deleted after a certain time. This is the retention time of a file and is used to calculate the file's expiration date or time. Such retention times are typically defined by the user when they create the backup policy for their data. Each file thus as a defined expiration date and will be deleted on that date. If many files with the same expiration date are distributed to the same node, their deletion may force the storage system to be out of balance, since that one node would then be significantly more empty compared to the other nodes.

What is needed therefore, is a way to maintain balance in a consistent hash ring for a distributed file system with certain backup processes using retention times of the files to distribute the files among multiple different physical nodes.

The subject matter discussed in the background section should not be assumed to be prior art merely as a result of its mention in this section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain are trademarks of Dell EMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

Figure 1:
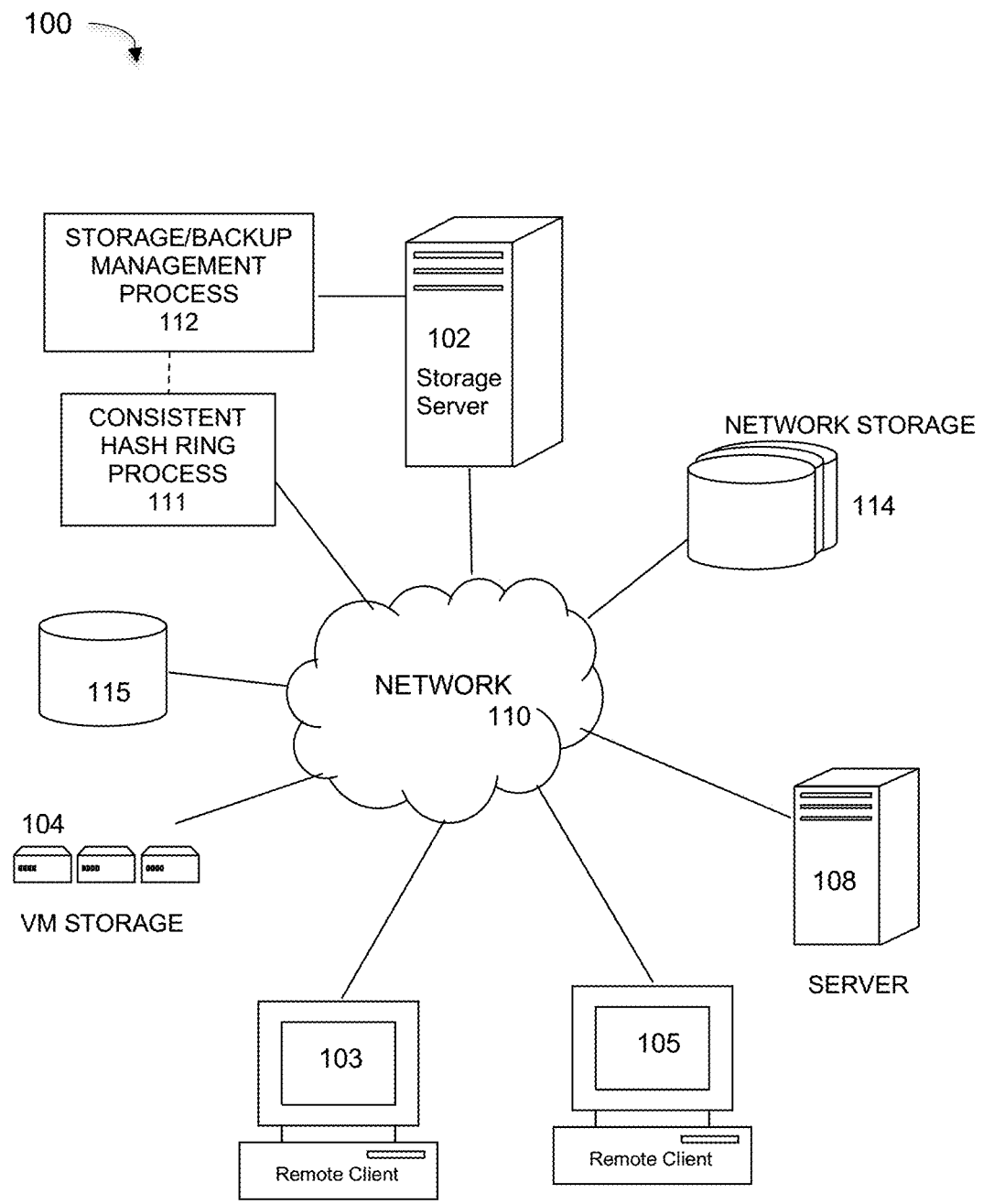
FIG. 1 is a diagram of a distributed file system network implementing a consistent hash ring process for backup operations, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Embodiments may be implemented in a distributed system, such as a cloud based network system or very large-scale wide area network (WAN), metropolitan area network (MAN), however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Embodiments are described for providing a retention time based consistent hash ring in large-scale deduplication backup systems. FIG. 1 illustrates a computer network system that implements one or more embodiments of a backup network system implementing a retention time based consistent hash ring, under some embodiments. In an embodiment, system 100 represents a large-scale network that implements a distributed file system that allows storage and access of files based on a client/server architecture in which servers or other storage devices store files that can be accessed by any number of remote clients in the network. Such a distributed file system makes it easy to distribute files among multiple clients and provide a centralized storage system that eliminates the need for clients to store files locally using their own resources.

In system 100, each networked component can function as a client or server that sources, stores, accesses, or otherwise processes the data in the system. These components are referred to as nodes in the system and can be implemented as either physical computers or devices, or as virtual machines using virtualization software. The nodes generally communicate with one another through network 110 through interface or routing devices (not shown). The network 110, is typically a cloud network, but may also be a LAN, WAN or other appropriate network. Network 110 provides connectivity to the various systems, components, and resources of system 100, and may be implemented using protocols such as Transmission Control Protocol (TCP) and/or Internet Protocol (IP), well known in the relevant arts. In a cloud computing environment, network 110 represents a network in which applications, servers and data are maintained and provided through a centralized cloud computing platform.

For the embodiment of FIG. 1, a storage server 102 executes a data storage or backup management process 112 that coordinates or manages the backup of data from one or more data sources to storage devices, such as network storage 114, client storage, and/or virtual storage devices 104. With regard to virtual storage 114, any number of virtual machines (VMs) or groups of VMs (e.g., organized into virtual centers) may be provided to serve as backup targets. The VMs or other network storage devices serve as target storage devices for data backed up from one or more data sources, in the network environment. The data sources may be other server computers 108 and he data sourced by the data source may be any appropriate data, such as database data that is part of a database management system, and the data may reside on one or more hard drives for the database(s) in a variety of formats. The data generated or sourced by system 100 and transmitted over network 110 may be accessed and processed by any number of client devices such as remote clients 103, 105, or other servers in the network.

In system 100, the data may be stored in any number of persistent storage locations and devices. In a backup case, the backup process 112 causes or facilitates the backup of this data to other storage devices of the network, such as network storage 114, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays. In an embodiment, system 100 may represent a Data Domain Restorer (DDR)-based deduplication storage system, and storage server 102 may be implemented as a DDR Deduplication Storage server provided by EMC Corporation. However, other similar backup and storage systems are also possible.

In a large-scale data processing an backup system such as system 100, the amount of data stored may be on the order of millions of files. Since the storage resources (e.g., 114, 115, 104) are shared among the various servers and clients (e.g., 103, 105, 108), the data may be distributed for storage in any and all storage devices. It is generally important to distribute the stored data evenly among the available storage devices to prevent any one storage resource to become full.

In a distributed file system, a distributed hash table is used to provide a lookup service using stored key-value pairs. Through this table, any node can efficiently retrieve the value associated with a given key. Consistent hashing is a distributed hashing scheme that operates independently of the number of servers or objects in a distributed hash table by assigning them a position on a hash ring. This allows servers and objects to scale without affecting the overall system.

In a distributed file system, the files are expected to be stored in different storage nodes as much as possible to balance the capacity of nodes. If one node becomes full, the entire hash ring can become unavailable, hence such load distribution is critically important. To ensure or at least promote load balancing, a consistent hash ring based on an object key attribute (usually file name) is used to distribute file data. Additional joins or removals of nodes only requires small parts of files to be re-shuffled.

Figure 2:
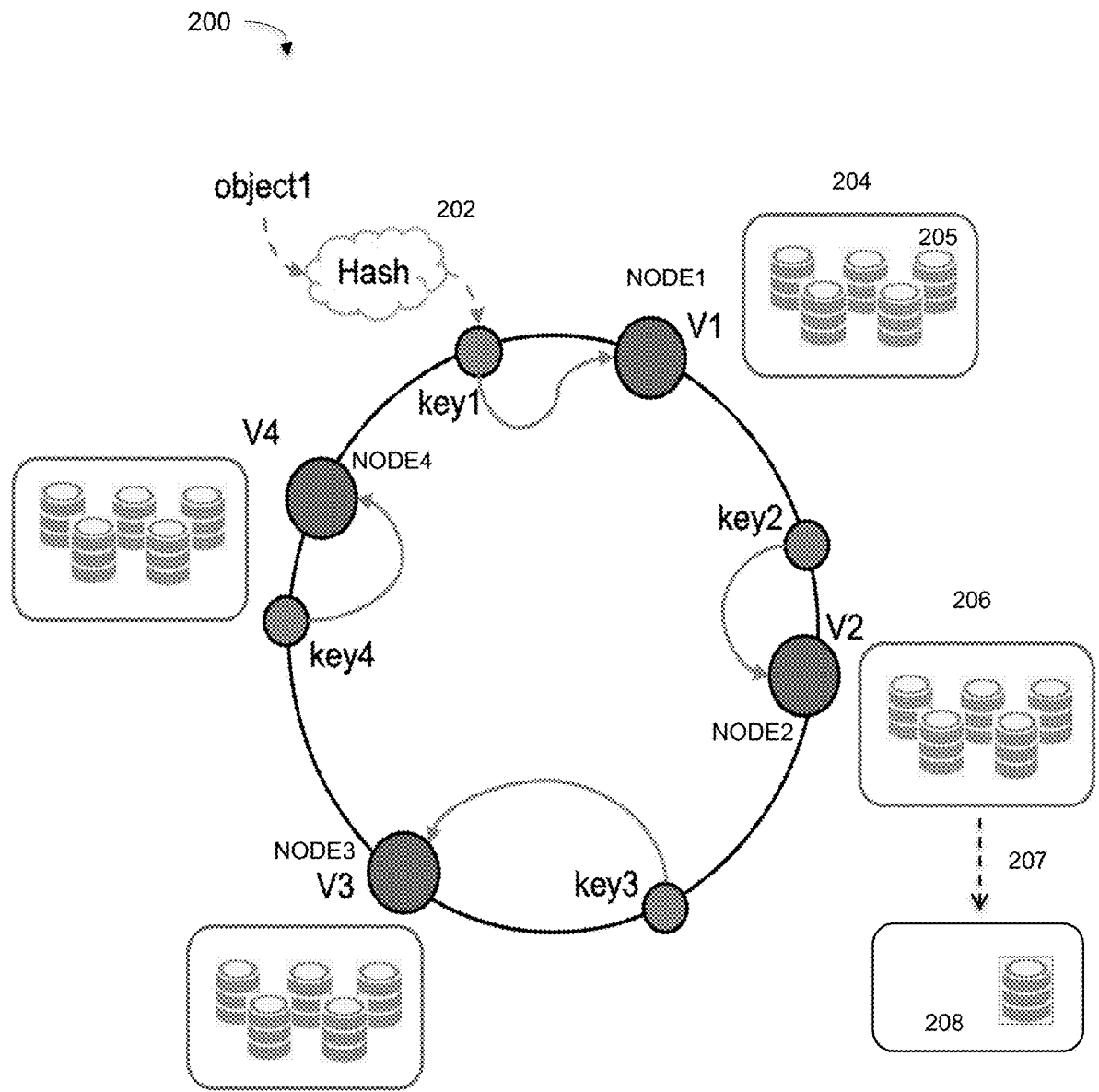
FIG. 2 illustrates an example consistent hash ring that has four nodes, under some embodiments.

FIG. 2 illustrates an example consistent hash ring that has four nodes denoted NODE1 to NODE4. Each node represents a storage resource in the network. A data object (object1), which may be a file, document, or any other data element is stored in a node at a location determined through consistent hash techniques. A hash value 202 for the object1 data element is produced by hashing an attribute of the object, such as the file name. Thus, in an example, Hash=hash(/path/filename). The hash value is used as a key to determine which node to store the object. Each node is assigned a number within the range of object hash values. For example, if the hash values range from 0 to 10,000, the nodes can be assigned values 100 for NODE1, 2,000 for NODE2, 5,000 for NODE3, and 8,000 for NODE4, or any similar assignment. The node hash values can be calculated using a defined formula, such as:

Node Hash Value=hash (IP address+CPU ID+Other Parameter) % max_object_hash

In general, any appropriate hash mechanism that can spread the node on the ring in a balanced manner can be used. For the hash parameter, the IP address for a node can be used, but other or more parameters can also be used, if necessary, as shown in the equation above.

The object (object1) is stored in the node with a node hash value that most closely matches the object hash value. Thus, in FIG. 2, if the object1 hash value is 10, object1 will be stored in NODE1, which has a node hash value of 100, and is the closest to 10 compared to all of the other nodes. Similarly, if it had an object hash value of 4,000, it would be stored in NODE3.

In a consistent hash ring, the object hash is compared to each node hash value in a set direction of the ring, such as clockwise. If the object hash exceeds the present compared node hash value, it is compared to the next node hash value. It is then stored in the node with the closest higher hash value.

Given the nature of hashing operations, it is presumed that data objects stored in the consistent hash ring scheme will be distributed more or less equally among the nodes of the system, as shown in FIG. 2 in which each node storage 204 stores approximately the same number of individual objects 205. However, present object key-based consistent hash ring methods cannot guarantee distribution of backup files evenly among multiple storage nodes.

In an embodiment, network 100 represents a deduplication backup system in which backup process 112 coordinates the storage of data in the different storage nodes using certain deduplication backup techniques and in a manner that satisfies any defined user service level agreements. The service agreements usually specify certain storage parameters, such as storage costs, usage rates, maximum processing latency, and so on. User specifications can also be set through one or more policies, and one such specification is typically a data retention period. To save storage costs or to promote data security, users may specify that old data be deleted after a certain period, such as months or years. This is a file's retention time which is used to calculate the expiration time (expire data) of the file. Each backup file thus has an expire data attribute and will be deleted when this date is reached or passed.

One issue with backup systems that implement certain user policies such as retention or expiration times, is that a significant number of files may be deleted at the same time. If these files are all assigned to the same node, their simultaneous expiration may unbalance the hash ring. This scenario is illustrated in FIG. 2, in which for NODE2, files stored in its storage 206 are reduced down to a much smaller number 208 due to file deletion operation 207. Such a situation leads to an obvious unbalance of the hash ring, as shown. To overcome the issue described above that present object key-based consistent hash ring methods do not always distribute backup files evenly among multiple storage nodes, embodiments include a consistent hash ring process 111 that factors in a file's expiration date wherein distributing the file in the ring. Such a process 111 may be provided as part of the backup process 112, or it may be executed as network (cloud) based process, or a process executed by any other server or node in the system.

Figure 3:
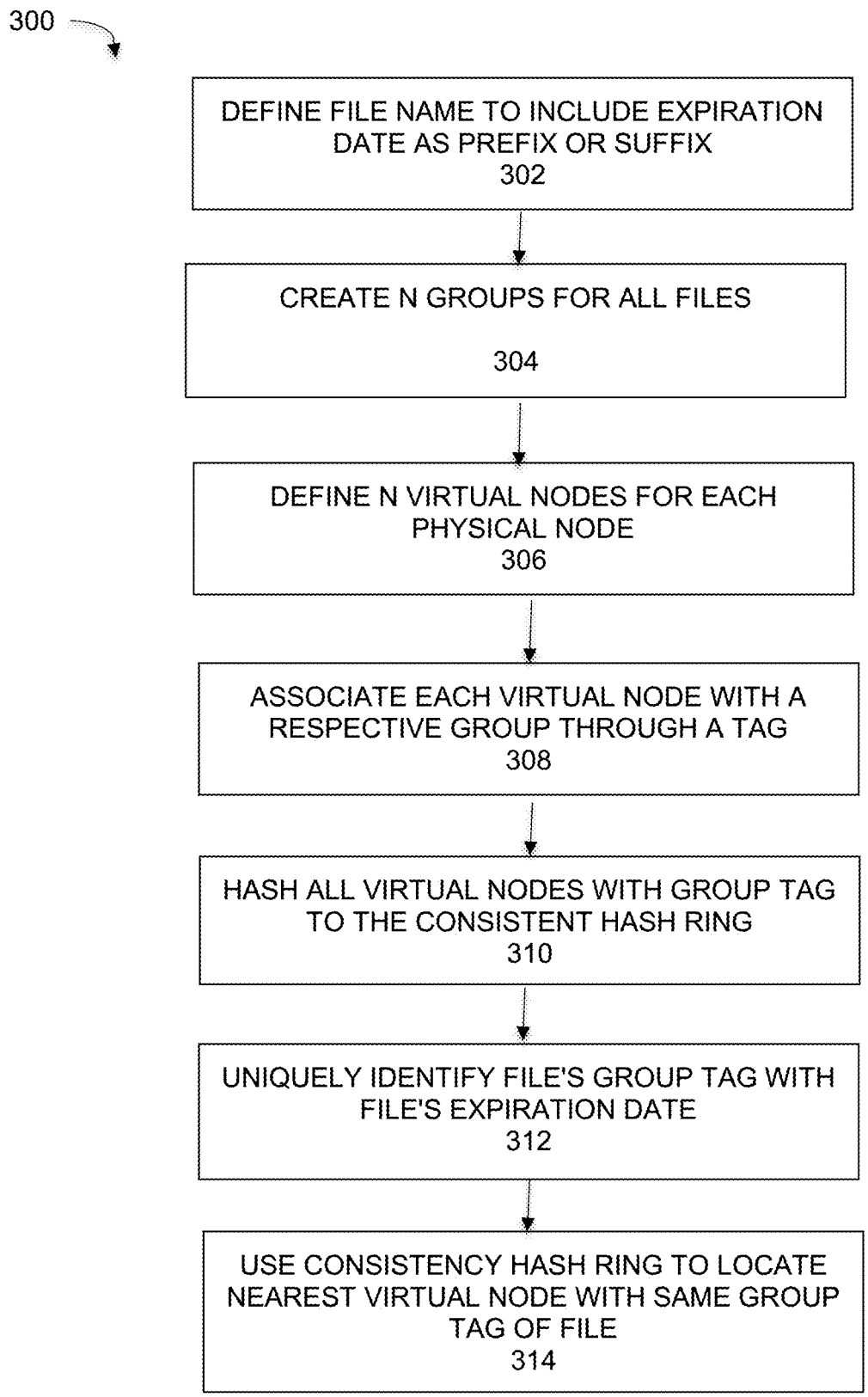
FIG. 3 is a flowchart that illustrates a method of performing a consistent hash ring process using file retention times, under some embodiments.

In an embodiment, the consistent hash ring process 111 distributes files with adjacent expiration dates to different nodes. FIG. 3 is a flowchart that illustrates a method of performing a consistent hash ring process using file retention times, under some embodiments. As shown in FIG. 3, process 300 begins with defining the file name format to include expiration date as a prefix or suffix, 302. In an embodiment, the expiration date is encoded as a unique identifier (UID) that is stored as metadata and that is attached to the file name as an numeric or alphanumeric suffix or prefix string. For example, such a defined file name may be formatted as: "file_name_mm/dd/year" where the mm/dd/year is the expiration date in standard numeric format, e.g., 07/31/2020. This is just one example, and any other similar or appropriate date or time code may be used. It is only necessary to attach the proper expiration date or time to the file name or other file identifier for recognition by process 111.

In step 304, the process 300 creates a number (N) groups. Each backup file with the same or adjacent or effectively adjacent expiration dates will be assigned to the same group. Files with adjacent expiration dates to fall into one group, but are assigned to different virtual nodes within the group. The degree of adjacency may be defined by the system. For example, if expiration dates fall on every day of the week, adjacent days are the days of the week in sequence Mon-Tues-Wed-Thurs-Fri-Sat-Sun. If the expiration is based on weeks of the month, the adjacency may be weeks per month Week1-Week2-Week3-Week4, and so on. Other adjacency definitions may also be used depending on the characteristics of the system and the definition of the expiration time.

In step 306, the process 300 defines N virtual nodes for each physical node. As shown in FIG. 2, each node, NODE1 to NODE4, has associated with it a corresponding virtual node set label, V1 to V4. Each virtual node (Vn) has a tag to represent one group, 308. The process then hashes all the virtual nodes with their respective group tags to the consistent hash ring, 310. When one file comes, the file's expiration date will uniquely identify the file's group tag, 312. The process then uses the consistency hash ring to locate the nearest virtual node with the same group tag of the file, 314. This process 300 thus uses the file key and the file expiration date together to locate the appropriate storage node.

Figure 4:
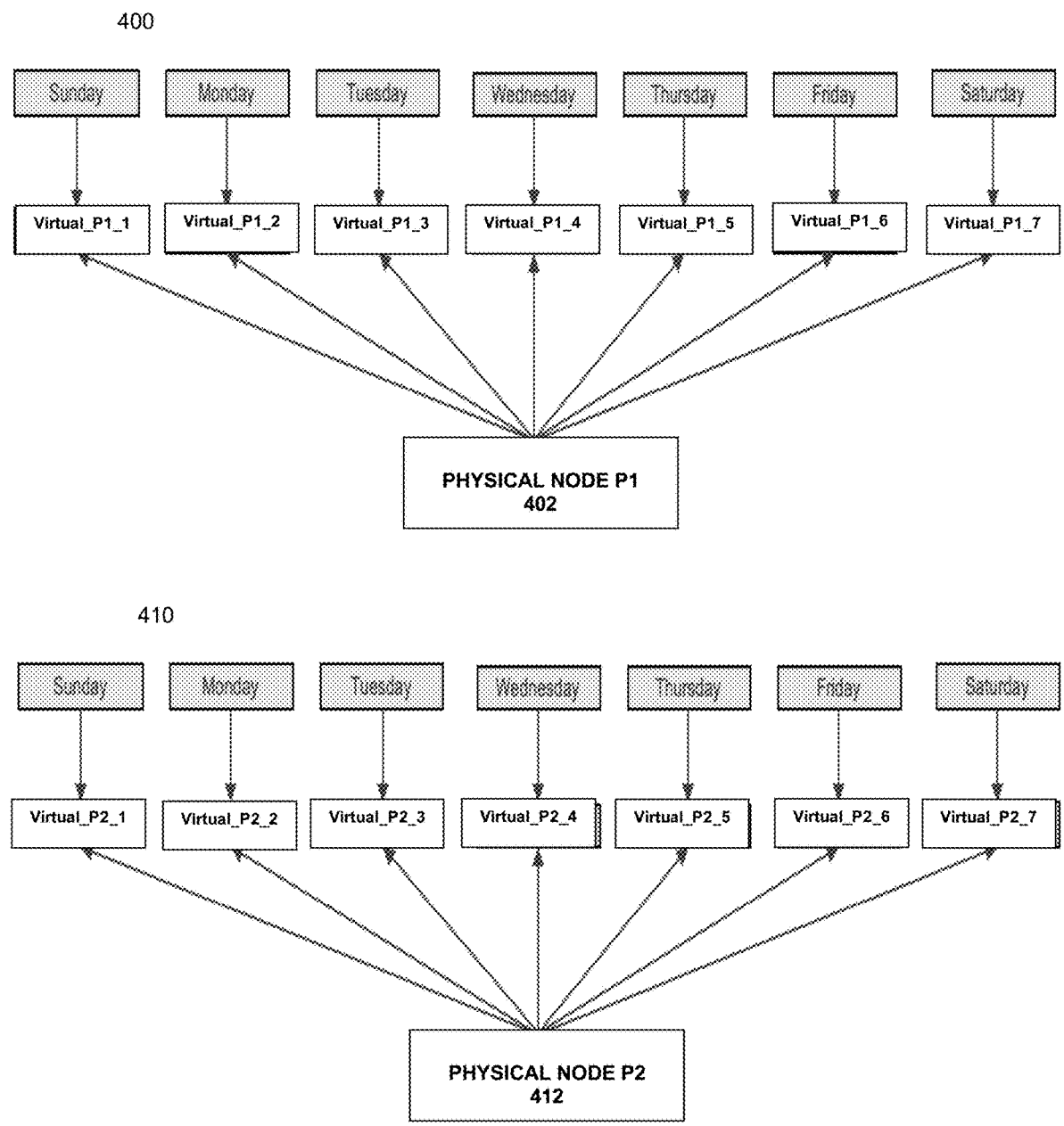
FIG. 4 illustrates the assignment of tagged virtual nodes for corresponding physical nodes, under an example embodiment.

Embodiments will be further described by way of example. For this example, the backup policy specifies a daily backup with a file retention time of seven days. This means that files are backed up seven days a week and are automatically deleted a week after they are created or last modified. Thus, a file created on Monday will expire and be automatically on the following Monday. In this case, the process 111 will define seven virtual nodes for each physical node, where each virtual node has a day of the week tag: Monday, Tuesday, Wednesday, Thursday, Friday, Saturday, and Sunday. FIG. 4 illustrates the assignment of tagged virtual nodes for corresponding physical nodes, under some embodiments. As shown in FIG. 1, diagram 400 illustrates the assignment of virtual nodes for physical node P1 402. For days of the week, seven virtual nodes are defined as denoted Virtual_P1_1, Virtual_P1_2, Virtual_P1_3, Virtual_P1_4, Virtual_P1_5, Virtual_P1_6, and Virtual_P1_7. Each virtual node is tagged with a different day of the week: Sunday, Monday, Tuesday, Wednesday, Thursday, Friday, and Saturday, as shown. Similarly, diagram 410 shows the assignment of virtual nodes for a different physical node P2

412 in the system. Again the seven virtual nodes are denoted accordingly as Virtual_P2_1, Virtual_P2_2, Virtual_P2_3, Virtual_P2_4, Virtual_P2_5, Virtual_P2_6, and Virtual_P2_7. Again, each virtual node is tagged with a different day of the week: Sunday, Monday, Tuesday, Wednesday, Thursday, Friday, and Saturday, as shown. Any remaining physical nodes (e.g., P3 and P4 of FIG. 1) are likewise processed to define tagged virtual nodes in the same manner.

Each virtual node in the network will store files that expire on the weekday corresponding to its tag. In this way, one virtual node will hold files that expire on the same day, and all physical node will hold files expire on the same day. FIG. 4 also illustrates a layered model in which the physical nodes represent low level nodes beneath numbers of virtual nodes. It allows the same tags (e.g., Monday-Sunday) to cause distribution to different physical nodes using the intermediate virtual node layer.

Figure 5:
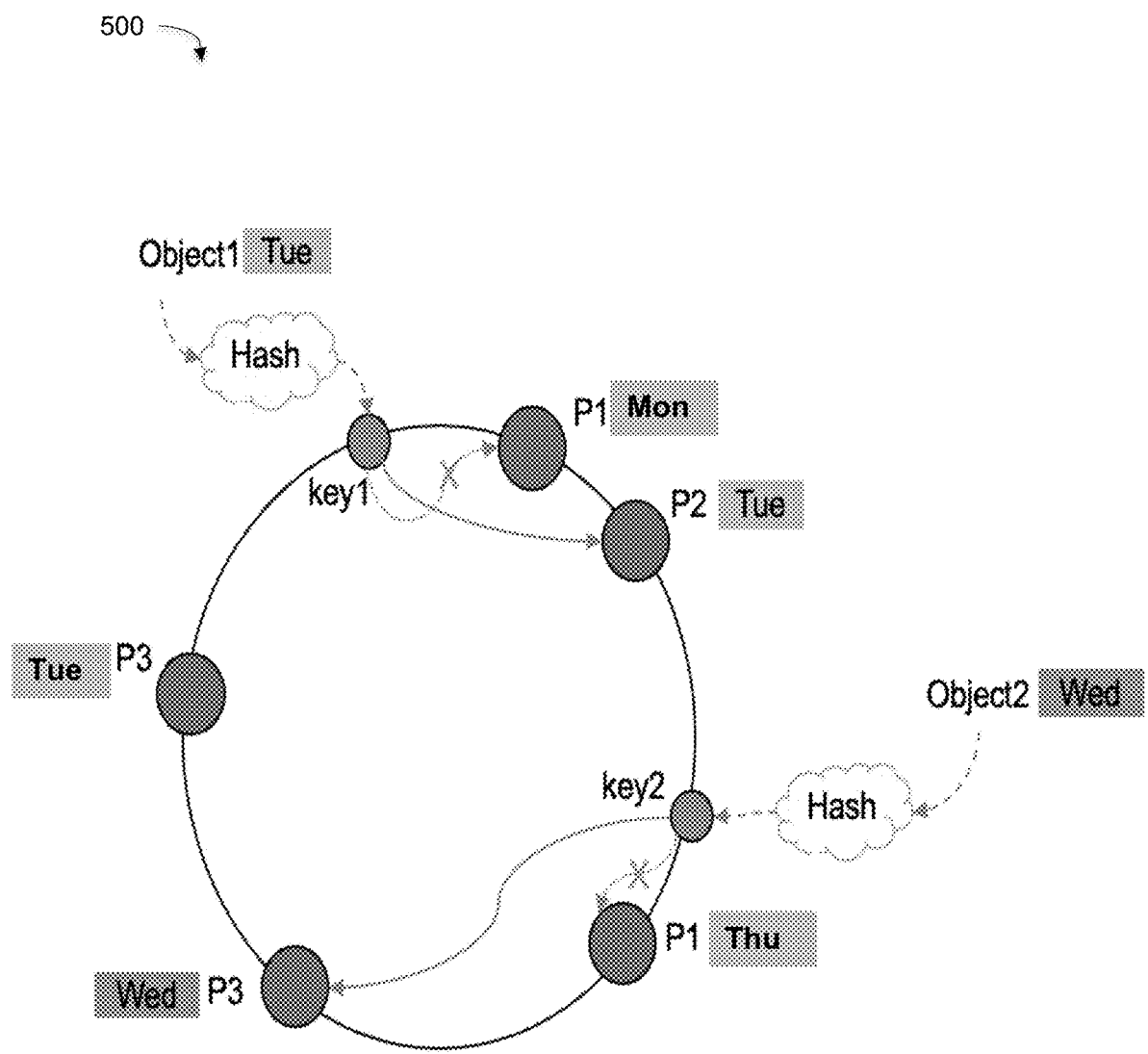
FIG. 5 illustrates the distribution of virtual nodes around a consistent hash ring for the example of FIG. 4.

Once the virtual nodes for each physical node are defined, they are distributed or spread around on the consistent hash ring. FIG. 5 illustrates the distribution of virtual nodes around a consistent hash ring for the example of FIG. 4, under some embodiments. As shown in diagram 500, hash ring 502 comprises several physical nodes denoted P1, P2, and P3 out of a number of possible physical nodes Pn. The key (key1) for a first data object, Object1, is formed by hashing the file name which includes a suffix or prefix with its expiration day. This allows an incoming file to be stored based on the weekday on which it will expire. The consistent hash ring is used to locate the nearest virtual node with the same weekday tag of the file.

This location step is performed by comparing the file key to the hash value of each node. That is: key→hash(IP address+Processor ID). As stated previously, for the hash of the virtual node, any appropriate hash mechanism that the results in hashes having a known even distribution on the ring, like the MD5 (message digest algorithm producing 128-bit hash value) or others, may be used. For example, key=md5(IP address string, appended with processor ID string, appended with like week day) % max_object_hash, or key=md5(IP address string, appended with week day) % max_object_hash.

In an embodiment, the key (e.g., key1 or key2) is formed as: KEY=HASH(FILE_NAME+EXPIRATION_DAY), and points to a specific virtual node Vn within a physical node Pn. Depending on where the key initially points to in the hash ring in terms of virtual node within a physical node (Pn_Vn location), the process will look for the next matching label based on expiration day if the first location does not result in an exact match. For example, two files A and B that both expire on the same day, Tuesday would yield the following keys:

key 1 for File_A_Tuesday==>hash(File_A_Tuesday), and key2 for File_B_Tuesday==>hash(File_B_Tuesday).

These keys would likely yield different physical storage nodes for the two files. Likewise hash(File_C_Wednesday) for key3 and hash (File_D_Wednesday) for key4 would also likely yield different physical node storage locations from each other or the other keys.

For the example of FIG. 5, Object1 expires on Tuesday. The consistency hash ring operation causes the Monday virtual node of P1 to be skipped over for key1 and causes it to be stored in the Tuesday tagged virtual node (e.g., Virtual_P2_3) of physical node P2. Similarly, Object2 having key2 from a hash incorporating its expiration day (Wed) is stored in the Wednesday tagged virtual node (e.g., Virtual_P3_4) of physical node P3, after skipping over the Thursday tagged virtual node for physical node P1.

The operation of the consistent hash ring causes the file as keyed based on a hash of the file name and expiration day (Monday to Sunday) to be distributed generally equally to all physical nodes. By tagging virtual nodes, the system knows that all virtual nodes with the same tag represent different physical nodes underneath. By adjusting distribution of a tagged file to a nearest node with the same tag, the system makes sure that a file with the same tag, or expiring on an adjacent day should be distributed equally to other lower level physical nodes.

Figure 6:
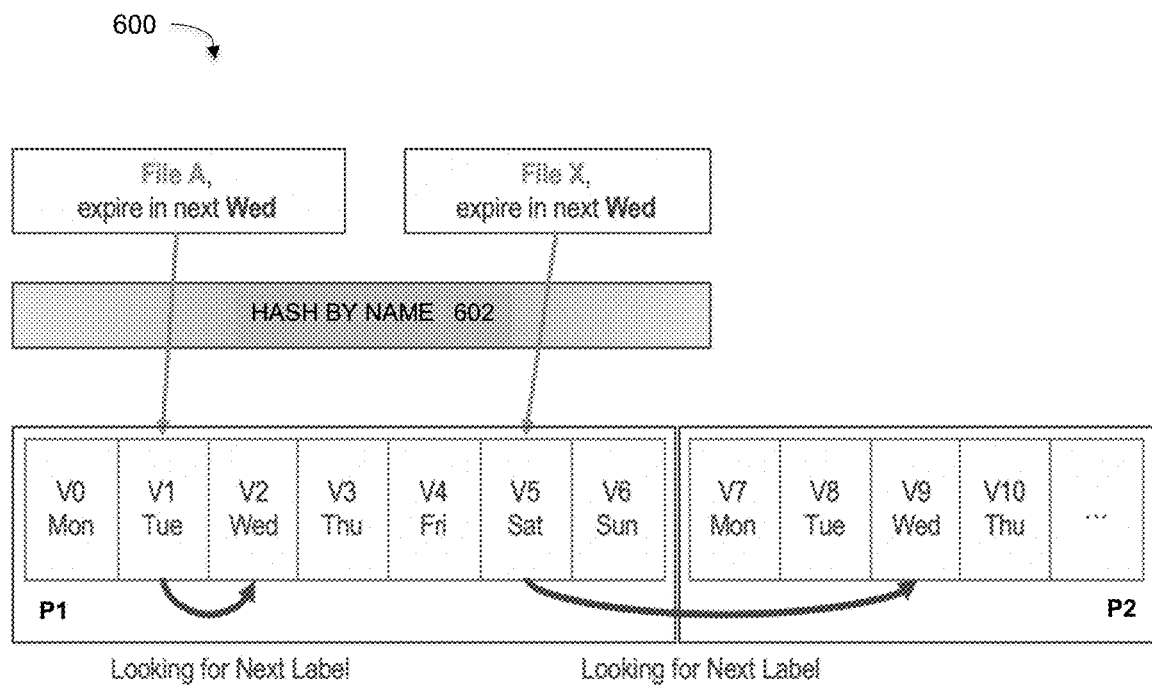
FIG. 6 illustrates distribution of a file among different physical nodes based on tagged virtual nodes, under some embodiments.

FIG. 6 illustrates distribution of a file among different physical nodes based on tagged virtual nodes, under some embodiments. As shown in diagram 600, two files denoted File A and File X both expire on a Wednesday. Diagram 600 also shows part of a consistent hash ring as comprising physical nodes P1 and P2. Each of these nodes has been subdivided into seven virtual nodes V0 to V6 and V7 to V13 for each of the days of the week (Monday to Sunday), as shown. The file name and expiration day for each of File A and File X are hashed to produce respective keys. The key for File A points to virtual node V1 in physical node P1. Since V1 is the virtual node labeled for Tuesday, and File A expires on Wednesday, the process looks for the next matching label for File A and it is actually stored in virtual node V2 of physical node P1. Likewise, the key for File X points to virtual node V5 in physical node P1. Since V5 is the virtual node labeled for Saturday, and File X expires on Wednesday, File X is moved around the consistent hash ring for the next virtual node labeled Wednesday, which in this case is V9 in physical node P2. The movement of files along the hash ring follows the principles of consistent hash ring movement in that a file is moved in a set direction (e.g., clockwise) through the virtual nodes for each physical node and through the physical nodes containing the virtual nodes.

FIG. 6 illustrates an example of the implementation and operation of a retention-based consistent hash ring. A set of virtual nodes is created for each physical node, and files with same expiration date should belong to the same virtual node. Through operation of the consistent hash ring techniques, these files can be distributed among multiple physical nodes even though they might have originally been saved in the same physical node.

As stated above, certain user or system-defined backup policies dictate the definition and creation of virtual nodes for the physical nodes. For the examples shown, a daily backup routine naturally yields seven virtual nodes per physical node. Other backup policies may thus dictate the creation of other or different virtual nodes within each physical node. In a large-scale backup system, there is typically more than one backup policy used by the users. These policies may have different retention times and frequencies.

Figure 7:
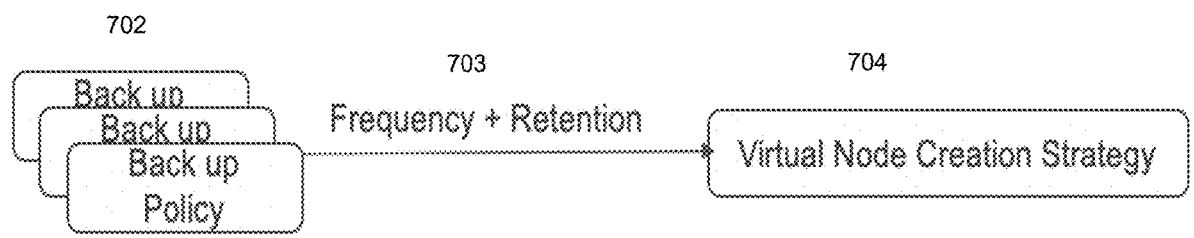
FIG. 7 illustrates the derivation of a virtual node creation strategy based on a number of different backup policies, under some embodiments.

FIG. 7 illustrates the derivation of a virtual node creation strategy 704 based on a number of different backup policies 702, under some embodiments. As shown in FIG. 7, an overall frequency and retention policy 703 combines the expiration time/day definitions in each of the individual backup policies 702 to create a single virtual node creation strategy 704. Each backup policy can have a different retention time and expiration frequency. In general, the use of many different backup policies in a large enough networks virtually ensures that files are expired at least every day, if not multiple times during each day. This process 703 selects a time granularity of the expiration times, e.g., hour-of-day versus day-of-week or week-of-month, and the number of virtual nodes per physical nodes.

Various different constraints or requirements can be used for the overall frequency and retention process 703 to define the number of virtual nodes created in strategy 704. For example, the number of virtual nodes created for each physical nodes should generally be kept to a minimum given processing overhead required to search and process data among virtual nodes within each physical node. Thus, a maximum number of virtual nodes may be defined as an upper threshold. Similarly, a minimum or maximum deletion frequency could be specified to help further dictate the number of virtual nodes created.

The example embodiments of FIGS. 4-7 illustrate virtual nodes that are created based on week day given a backup policy that dictates daily backups. The process thus creates seven virtual nodes per physical nodes based on the weekday, Monday, Tuesday, and so on. It should be noted however, that embodiments are not so limited, and any number of virtual nodes may be created for each physical node depending on the particular backup policy that is used.

Embodiments of the retention-based consistent hash ring process define each file name in the system to include its expiration date (or time) as a prefix or suffix that is stored and indexed as metadata. The process uses a virtual node to represent adjacent expiration days to create virtual nodes based on individual days of the week. Each physical node contains the same number of labeled virtual nodes, and the consistent hash ring process is used to move files with the same expiration day to different physical nodes by looking for next labeled virtual nodes on the hash ring. This provides a way to locate the virtual node storage location by specifying a file's expiration date as part of the key used in the hash ring process, and distributes files that may otherwise be assigned to the same physical node through a backup policy.

System Implementation

Embodiments of the processes and techniques described above can be implemented on any appropriate backup system operating environment or file system, or network server system. Such embodiments may include other or alternative data structures or definitions as needed or appropriate.

Figure 8:
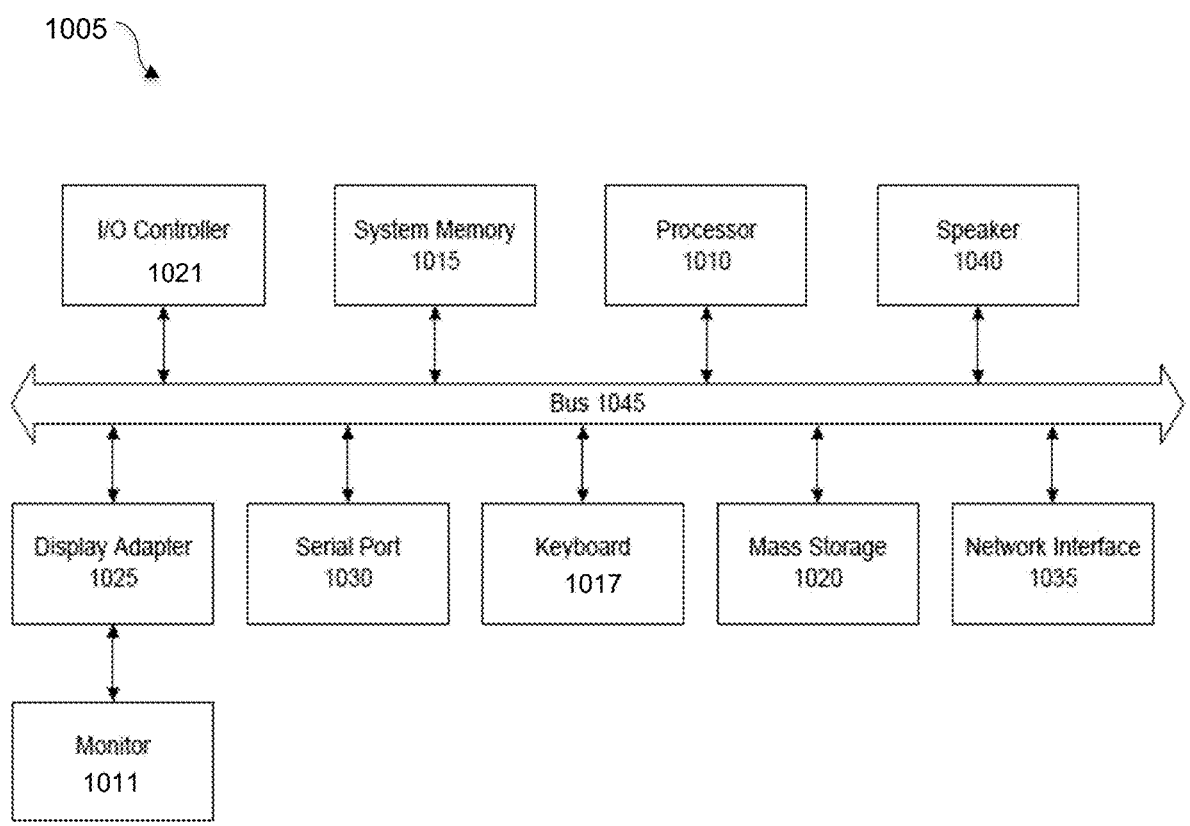
FIG. 8 is a system block diagram of a computer system used to execute one or more software components of the consistent hash ring process, under some embodiments.

The network of FIG. 1 may comprise any number of individual client-server networks coupled over the Internet or similar large-scale network or portion thereof. Each node in the network(s) comprises a computing device capable of executing software code to perform the processing steps described herein. FIG. 8 shows a system block diagram of a computer system used to execute one or more software components of the present system described herein. The computer system 1005 includes a monitor 1011, keyboard 1017, and mass storage devices 1020. Computer system 1005 further includes subsystems such as central processor 1010, system memory 1015, I/O controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1005 shown in FIG. 8 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system 1005 may be one of the Microsoft Windows®. family of systems (e.g., Windows Server), Linux, Mac OS X, IRIX32, or IRIX64. Other operating systems may be used. The computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, among other examples), near field communication (NFC), radio-frequency identification (RFID), mobile or cellular wireless. For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of balancing a consistent hash ring having a number of physical nodes representing storage resources in a client-server computer network, comprising:
   defining a file name for each file used in a file system to include an expiration day of a corresponding file;
   creating a plurality of virtual nodes for each of the physical nodes, wherein each virtual node is labeled with a different day of the week as a label;
   creating a key for each file by hashing the corresponding file name including the expiration day; and
   using the key to locate a physical node storage location for a respective file by identifying corresponding virtual nodes having a same label as the expiration day of the respective file.

2. The method of claim 1 wherein the network implements a distributed file system storing files in one or more centralized storage resources by access by a plurality of clients.

3. The method of claim 2 wherein the network comprises backup server executing a deduplication backup system.

4. The method of claim 3 wherein at least part of the network comprises a virtualized network, and further comprises virtual storage implemented one or more virtual machines in the network.

5. The method of claim 3 wherein the expiration day is defined by a retention time corresponding to a file deletion frequency set in a backup policy.

6. The method of claim 5 further comprising:
   defining a plurality of backup policies for the file system, each backup policy applied to one or more files of the file system; and
   applying a frequency and retention policy to the plurality of backup policies to derive the retention time.

7. The method of claim 1 further comprising determining a first entry point of the file into the consistent hash ring by determining physical node corresponding to a nearest match of the key based on a hash value of the file name compared to a calculated hash value for each physical node.

8. The method of claim 7 further comprising:
   comparing the key after the first entry point to a next label of a virtual node in the physical node; and if there is no match
   comparing the key to virtual nodes in a next physical node adjacent to the physical node to identify a first virtual node matching the key.

9. The method of claim 7 wherein the hash value for each physical node comprises a hash of a processor identifier and network address of the physical node.

10. A method of balancing storage of files in a distributed file based computer network, comprising:
    defining a consistent hash ring having a number of physical nodes representing storage resources of the network;
    defining, for each physical node, a plurality of virtual nodes, each labeled with a different day of the week;
    defining an expanded file name for each file to include a directory path and name of the file and an expiration date of the file appended as a prefix or suffix;
    deriving a key for each file comprising a hash value of the expanded file name of the file; and
    using the key to find a nearest matching virtual node in a physical node based on a match of the day of week label of the virtual node and the expiration date of the key hash value.

11. The method of claim 10 further comprising determining a first entry point of the file into the consistent hash ring by determining physical node corresponding to a nearest match of the key based on a hash value of the file name compared to a calculated hash value for each physical node.

12. The method of claim 11 further comprising:
    comparing the key after the first entry point to a next label of a virtual node in the physical node; and if there is no match
    comparing the key to virtual nodes in a next physical node adjacent to the physical node to identify a first virtual node matching the key.

13. The method of claim 10 wherein the hash value for each physical node comprises a hash of a processor identifier and network address of the physical node.

14. The method of claim 10 wherein the network implements a distributed file system storing files in one or more centralized storage resources by access by a plurality of clients, and comprises backup server executing a deduplication backup system.

15. The method of claim 14 wherein the expiration day is defined by a retention time corresponding to a file deletion frequency set in a backup policy.

16. The method of claim 15 further comprising:
    defining a plurality of backup policies for the file system, each backup policy applied to one or more files of the file system; and
    applying a frequency and retention policy to the plurality of backup policies to derive the retention time.

17. A system for balancing storage of files in a distributed file based computer network comprising: a processor; and memory configured to store one or more sequences of instructions which, when executed by the processor, cause the processor to carry out the steps of:
    defining a consistent hash ring having a number of physical nodes representing storage resources of the network;
    defining, for each physical node, a plurality of virtual nodes, each labeled with a different day of the week;
    defining an expanded file name for each file to include a directory path and name of the file and an expiration date of the file appended as a prefix or suffix;
    deriving a key for each file comprising a hash value of the expanded file name of the file; and using the key to find a nearest matching virtual node in a physical node based on a match of the day of week label of the virtual node and the expiration date of the key hash value.

18. The system of claim 17 wherein the method further comprises:
determining a first entry point of the file into the consistent hash ring by determining physical node corresponding to a nearest match of the key based on a hash value of the file name compared to a calculated hash value for each physical node;
comparing the key after the first entry point to a next label of a virtual node in the physical node; and if there is no match
comparing the key to virtual nodes in a next physical node adjacent to the physical node to identify a first virtual node matching the key.

19. The system of claim 18 wherein the hash value for each physical node comprises a hash of a processor identifier and network address of the physical node, and wherein the network implements a distributed file system storing files in one or more centralized storage resources by access by a plurality of clients, and comprises backup server executing a deduplication backup system.

20. The system of claim 19 wherein the expiration day is defined by a retention time corresponding to a file deletion frequency set in a backup policy, and the method further comprises:
defining a plurality of backup policies for the file system, each backup policy applied to one or more files of the file system; and
applying a frequency and retention policy to the plurality of backup policies to derive the retention time.

* * * * *